United States Patent
Hajdukiewicz et al.

(10) Patent No.: US 7,055,258 B2
(45) Date of Patent: Jun. 6, 2006

(54) KINEMATIC COUPLING WITH DAMPER

(75) Inventors: Peter Hajdukiewicz, Gloucestershire (GB); David R McMurtry, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/509,174

(22) PCT Filed: Apr. 4, 2003

(86) PCT No.: PCT/GB03/01496

§ 371 (c)(1),
(2), (4) Date: Sep. 27, 2004

(87) PCT Pub. No.: WO03/087708

PCT Pub. Date: Oct. 23, 2003

(65) Prior Publication Data

US 2005/0150125 A1    Jul. 14, 2005

(30) Foreign Application Priority Data

Apr. 5, 2002 (GB) .................... 0207912.7

(51) Int. Cl.
*G01B 5/12* (2006.01)
(52) U.S. Cl. ........................................ 33/559
(58) Field of Classification Search ............... 33/503, 33/556, 559–561
See application file for complete search history.

(56) References Cited

U.S. PATENT DOCUMENTS

| | | | | |
|---|---|---|---|---|
| 4,136,458 A | * | 1/1979 | Bell et al. ................ | 33/561 |
| 4,462,162 A | * | 7/1984 | McMurtry ................ | 33/561 |
| 4,523,382 A | * | 6/1985 | Werner et al. ........... | 33/556 |
| 5,041,806 A | * | 8/1991 | Enderle et al. .......... | 33/561 |
| 5,209,131 A | * | 5/1993 | Baxter ..................... | 33/559 |
| 5,212,872 A | * | 5/1993 | Spivey et al. ............ | 33/558 |
| 5,259,122 A | | 11/1993 | Ichiba et al. | |
| 5,353,514 A | | 10/1994 | McMurtry | |
| 5,446,970 A | | 9/1995 | McMurtry et al. | |
| 5,755,038 A | * | 5/1998 | McMurtry ................ | 33/559 |
| 6,526,672 B1 | * | 3/2003 | Danielli et al. .......... | 33/561 |

FOREIGN PATENT DOCUMENTS

| | | |
|---|---|---|
| EP | 0 426 492 A2 | 5/1991 |
| EP | 0 501 710 A1 | 9/1992 |
| JP | A 09-096518 | 4/1997 |
| WO | WO 01/92829 A1 | 12/2001 |

* cited by examiner

*Primary Examiner*—G. Bradley Bennett
(74) *Attorney, Agent, or Firm*—Oliff & Berridge, PLC

(57) ABSTRACT

Apparatus for releasably connecting together two members (18, 20) comprises two members (18, 20), each provided with co-operating elements (22*a*, 24A) to define the location of one member with respect to the other member. A damper (30) is provided on at least one of the members to reduce the impact when the two members are joined together. The two members may comprise two modules of a modular surface sensing probe. The damper may include guide means to assist in guiding the members together.

17 Claims, 4 Drawing Sheets

KINEMATIC COUPLING WITH DAMPER

The present invention relates to damping for kinematically coupled parts. In particular, the invention is suitable for damping of kinematically coupled parts of a touch probe.

Our earlier European patent 0501710 discloses a probe which comprises a sensing module and a stylus module held together by magnetic means, their relative positions being defined by kinematic elements. The stylus module holds a workpiece-contacting stylus, which is deflected on contact with a workpiece. The sensing module comprises a fixed structure which may be connected to the movable arm of a coordinate positioning machine and contains transducers which detects the deflection of the stylus. The modular nature of the probe enables the stylus modules to be exchanged, thus allowing different types of styli, for example different lengths of stylus, to be used.

This probe has the disadvantage that if very large styli are used the magnetic force required to retain the stylus module on the sensing module is also large. The large magnetic force has the effect that it causes an impact when the two modules are connected together which can upset the electronic transducers in the sensing module, causing them to become unreliable.

Furthermore, the impact can cause wear and damage to the kinematic elements of the modules which would affect the metrology of the system.

The present invention provides apparatus comprising a first member, the first member being arranged for releasable connection to a second member;

said first member being provided with a set of elements to co-operate with a corresponding set of elements on the second member to define the location of the first member with respect to the second member when the first member and second member are brought into contact with one another;

a damper on the first member, such that relative motion between the first member and second member is damped as they are brought into contact with one another.

The damper reduces the impact when the two members are joined together.

Preferably the first member and second member are releasably held together by magnetic means.

Preferably the damper comprises a housing in which a piston is located, said piston being biased to protrude from the housing and wherein the housing is filled with a viscous substance.

The damper may also comprise at least one guide means which assists in guiding the first member and second member together. The at least one guide means may comprise at least one guide pin attached to the damper, said at least one guide pin being received by at least one corresponding recess on the second member. The arrangement of the at least one guide pin and at least one corresponding recess may be such that said at least one guide pin and recess do not interfere with the position of the first member relative to the second member as defined by the cooperating elements.

Preferably the first and second elements constrain the first member with respect to the second member kinematically. When the first member and second member are connected together, the position of the first member relative to the second member is defined solely by the co-operating elements.

The first member may be one of a retaining module and task module of a modular surface sensing probe and the second member may be the other of the retaining module and task module of said modular surface sensing probe.

A second aspect of the invention provides apparatus comprising a first member, the first member being arranged for releasable connection to a second member, in combination with a said second member comprising:

a first member being provided with a set of elements to co-operate with a corresponding set of elements on the second member to define the location of the first member with respect to the second member when the first member and second member are brought into contact with one another;

a damper on the first member, such that relative motion between the first member and second member is damped as they are brought into contact with one another;

wherein the second member is also provided with a damper, such that relative motion between the first member and the second member is damped as they are brought into contact with one another.

A third aspect of the present invention provides a task module for releasable connection to a retaining module of a modular surface sensing probe, the task module comprising:

a member to be releasably coupled to a retaining module;

a set of elements on said member to co-operate with a corresponding set of elements on the retaining module to define the location of the task module with respect to the probe when the task module and retaining module are brought into contact with one another;

and a damper on the task module, such that relative motion between the task module and retaining module is damped as they are brought into contact with one another.

The retaining module and task module may comprise a probe head such as an articulating probe head allowing rotation about at least one axis, and probe respectively. The retaining module and task module may comprise a sensing module and a stylus module of a probe.

The damper may comprise a damper housing in the member and a damper piston located in the damper housing biased to protrude from the housing. The damper housing may be filled with a viscous substance to resist movement of the damper piston with the damper housing.

A fourth aspect of the present invention provides a modular surface sensing probe comprising:

a retaining module;

a task module releasably connectable to the sensing module;

a first set of elements on said retaining module and a second set of elements on said task module, said elements co-operating to define the location of the task module with respect to the retaining module when the task module and retaining module are brought into contact with one another;

wherein a damper is provided on one of said task module and retaining module, such that relative motion between the task module and retaining module is damped as they are brought into contact with one another.

Reference should be made to U.S. Pat. No. 5,446,970 for a discussion of one meaning of the terms "kinematic", "kinematically" and like terms, as used in this specification. These terms encompass not only kinematic supports in which point contacts are provided between the respective pairs of elements on the members/modules, but also semi- or quasi-kinematic supports, in which there are small areas of lines of contact between the respective elements.

Preferred embodiments of the invention will now be described by way of example, with reference to the accompanying drawing wherein.

Figure 1:
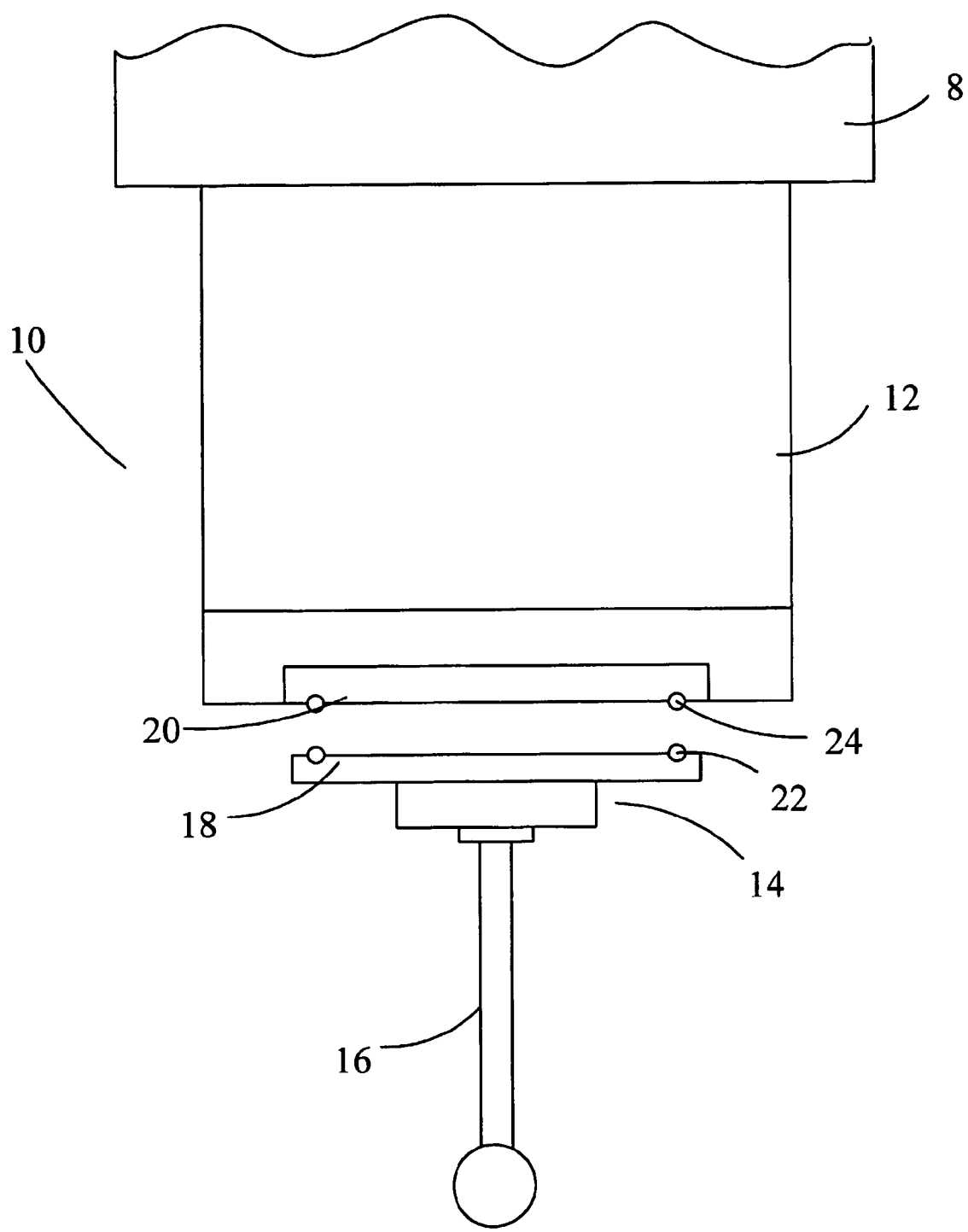
FIG. 1 shows a simplified internal view of the probe.

FIG. 1 shows a simplified view of an analogue probe 10 of the invention which is shown mounted on the movable arm 8 of a coordinate measuring machine (CMM) and which comprises a sensing module 12 and a stylus module 14. The stylus module 14 has a workpiece contacting stylus 16 and the sensing module 12 has electronic transducers (not shown) which measure the deflection of the stylus 16. The stylus module 14 is de-mountable from the sensing module 12 and may be removed and exchanged with other stylus modules, for example it may be exchanged with a stylus module having a longer stylus. The stylus module 14 is provided with a plate 18 which is connectable to a mounting plate 20 of the sensing module 12. The plate 18 and mounting plate 20 are held together magnetically and are each provided with kinematic elements 22,24 to define the position of the stylus module 14 with respect to the mounting plate 20 of the sensing module 12 and ensure repeatability of location of the stylus module 14.

Figure 2:
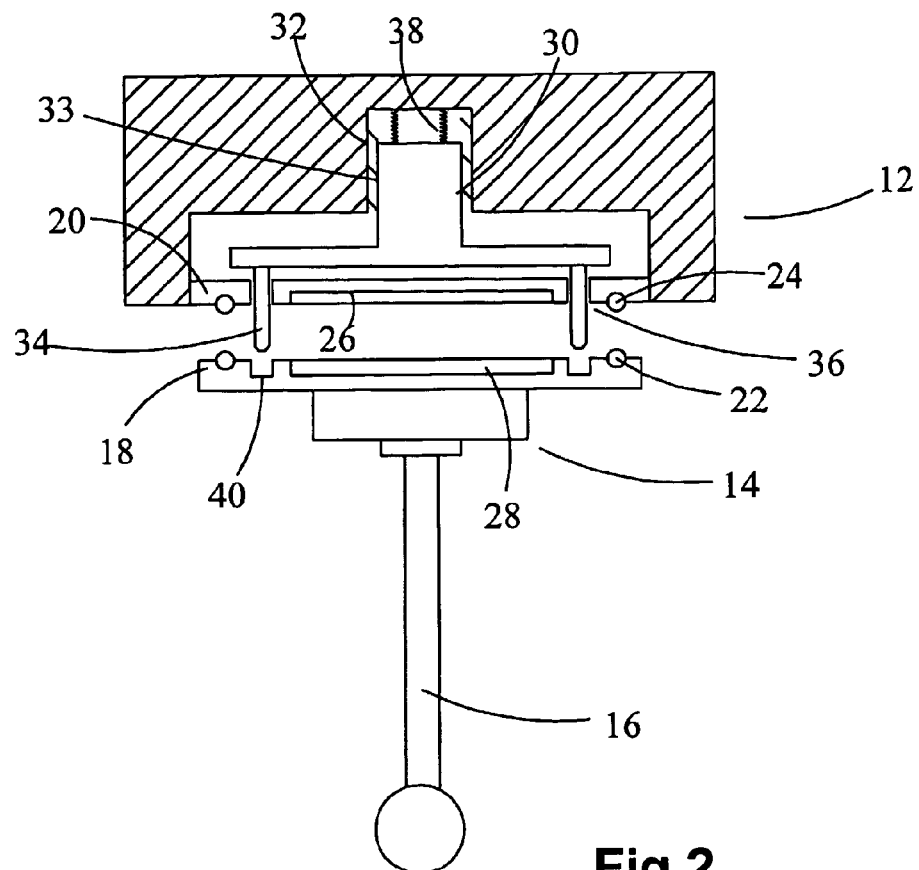
FIG. 2 shows a cross-section of a part of the sensing module and the stylus module.
Figure 3:
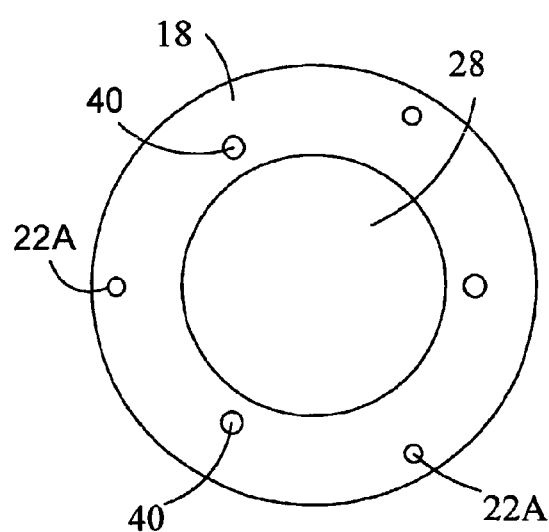
FIG. 3 shows the plate of the stylus module.
Figure 4:
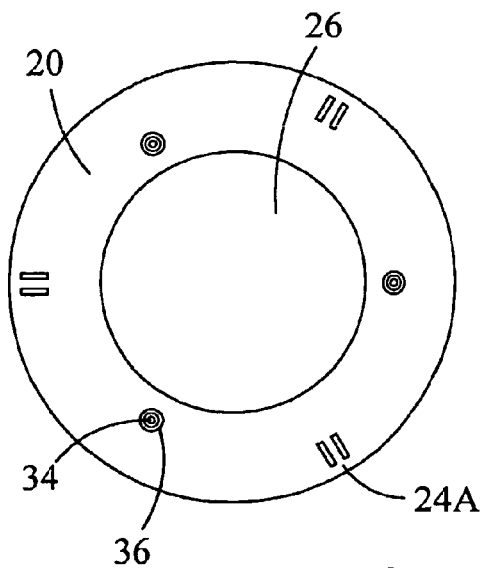
FIG. 4 shows the plate of the sensing module.

FIGS. 2–4 illustrate the stylus module 14 and part of the sensing module 12 of the probe in more detail. The sensing module 12 has a mounting plate 20 to which a plate 18 of the stylus module 14 is connected. The modules 12,14 have co-operating kinematic elements 22,24 to define the position of the plate 18 of the stylus module 14 on the mounting plate 20 of the sensing module 12. The kinematic elements 22,24 may comprise a set of three balls 22A spaced at 120° around the centre of the plate 18 which cooperate with a similarly spaced set of three pairs of radial parallel rollers 24A on the mounting plate 20 as shown in FIGS. 3 and 4. Alternative sets of elements may be used to define the position of the stylus module 14 with respect to the mounting plate 20. For example, the pairs of parallel rollers may be replaced by pairs of balls on one plate which co-operate with the single balls on the other plate.

The plate 18 and mounting plate 20 are held together by a strong magnet. FIG. 2 shows a magnet 26 provided on the sensing module 12 and a keeper plate 28 provided on the stylus module 14.

A damper is provided between the sensing module 12 and stylus module 14 to cushion the impact when the two modules are brought together.

The damper may be located on either or both modules.

FIG. 2 shows a damper located in the retaining module. The damper comprises a damper piston 30 inserted in a damper housing 32 behind the mounting plate 20 of the sensing module 12. Three guide pins 34 are connected to the damper piston 30 and protrude through three apertures 36 in the mounting plate 20. The guide pins 34 and apertures 36 are spaced at 120° about the centre of the mounting plate 20.

A viscous substance 33 such as grease, oil or air is provided inside the damper housing 32 to provide resistance to movement of the damper piston 30. The damper piston 30 is biased away from the damper housing 32 by springs 38 between the damper housing 32 and the damper piston 30.

The stylus module 14 is provided with three recesses 40 to receive the guide pins 34. As the stylus module 14 is brought into contact with the sensing module 12, the guide pins 34 are inserted into their corresponding recesses 40 in the stylus module 14. The guide pins 34 are pushed back by the stylus module 14 and in turn push the damper piston 30 into the damper housing 32 which causes resistance due to the viscous damping effect of the grease.

The guide pins 34 have the added benefit that if the stylus module 14 is not correctly aligned with the sensing module 12, for example it might be tilted, the guide pins 34 assist in correctly aligning the stylus module 14 so that the kinematic elements 20,24 connect together.

The guide pins aid in the initial alignment of the two modules. However once the modules are connected, it is important that the guide pins do not effect the position of the stylus module as defined by the kinematic elements. The guide pins and corresponding recesses therefore have a loose fit so not to constrain the lateral position of the stylus module relative to the sensing module.

Figure 5:
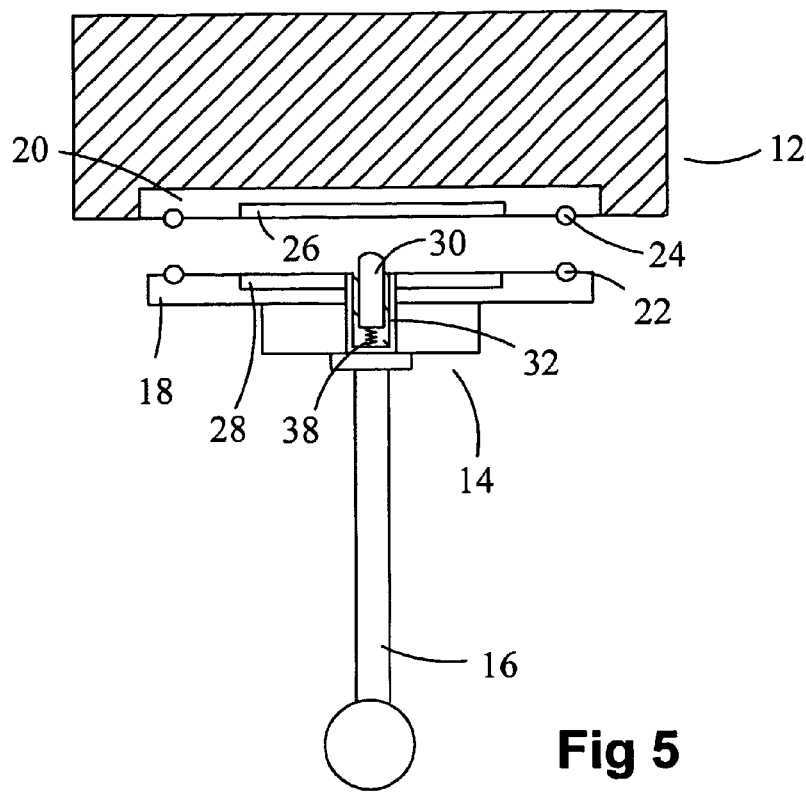
FIG. 5 shows the a cross-section of a part of the sensing module and the stylus module of a second embodiment of the invention.
Figure 6:
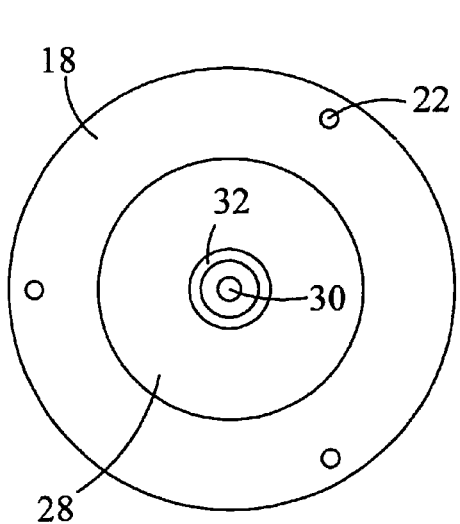
FIG. 6 shows the plate of the stylus module of the second embodiment of the invention.
Figure 7:
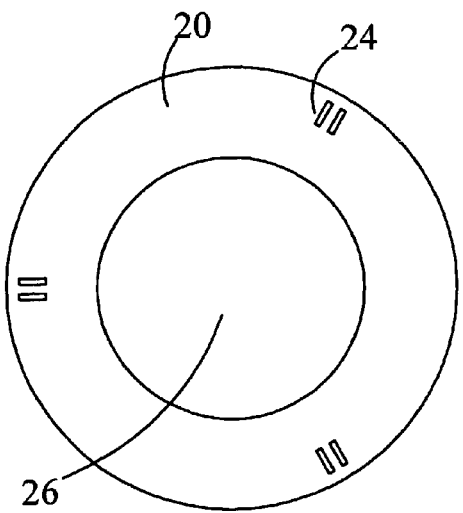
FIG. 7 shows the plate of the sensing module of the second embodiment of the invention.

In a second embodiment, as illustrated by FIGS. 5–7, the damper is provided in the stylus module. Identical features with the previous embodiment use the same reference numbers. The keeper plate 28 in the stylus module plate 14 has a recess which accommodates the damper housing 32 and a damper piston 30 is located in this housing. As before the damper piston 30 is biased to protrude from the housing 32 by a spring 38 between the housing 32 and the damper piston 30. A viscous substance such as grease, oil or air is provided inside the damper housing 32. Thus when the stylus module 14 is brought into contact with the sensing module 12, the damper piston 30 is pushed by the mounting plate 20 of the sensing module 12 into the housing 32 against the viscous substance, lessening the impact and preserving the integrity of the transduced signals.

Figure 8:
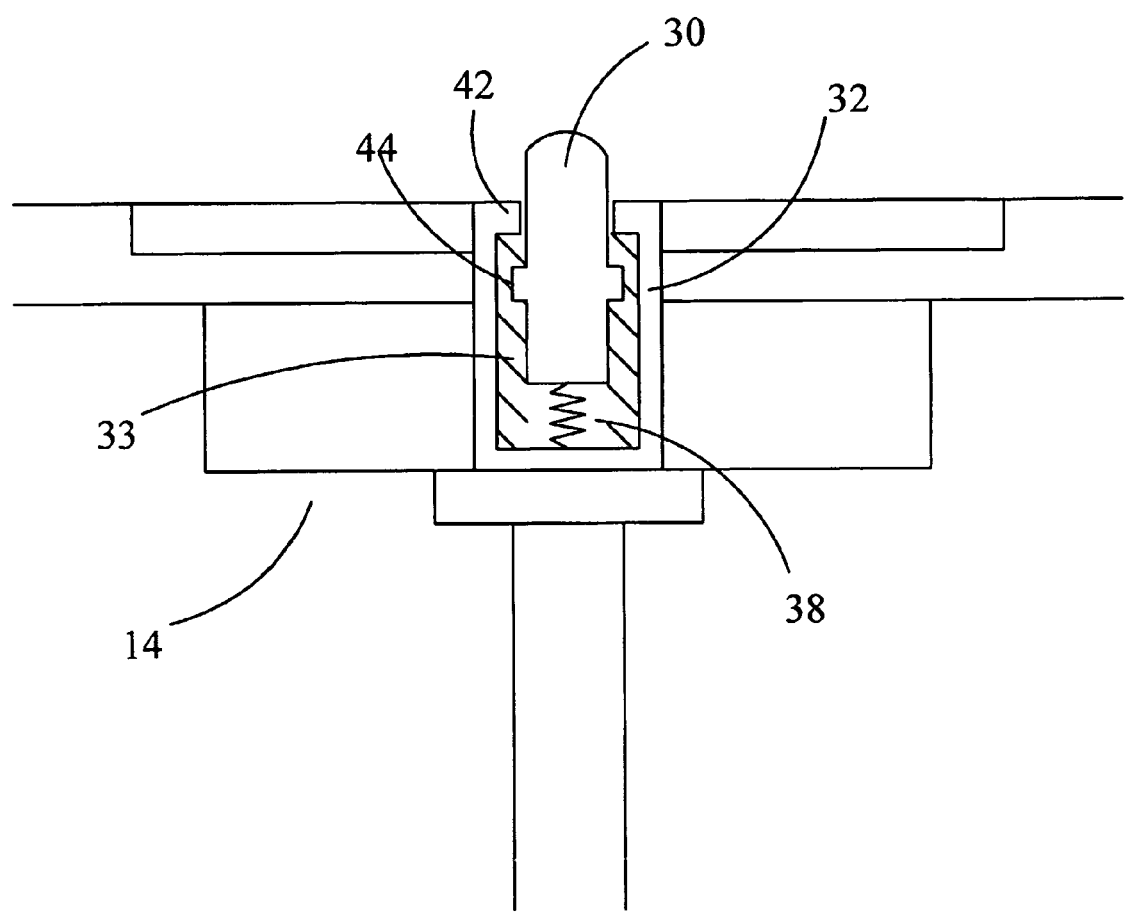
FIG. 8 shows the damper of the second embodiment of the invention.

FIG. 8 shows the damper in the second embodiment in more detail. The damper housing 32 may be have a lip 42 around its open end, and the piston may be provided with lugs 44 to retain it in the damper housing 32.

As described above, the co-operating kinematic elements define the position of the stylus module on the sensing module. It is important that the damper does not interfere with this positioning of the stylus module, so that the position of the stylus module with respect to the sensing module remains defined solely by the kinematic elements. The damper must therefore be able to offer resistance to movement perpendicular to the adjacent surfaces of the modules but not constrain movement parallel to the surfaces.

In the embodiments described above a viscous damper is used. The friction between the damper piston and the surface against which it abuts varies with the force applied to the damper piston. When a high force is applied to the piston, high friction results and when a low force is applied to the piston, low friction results. When the modules are brought into contact, a high force is applied to the piston and there is high friction between the piston and the abutting surface of the other module. However, once the modules are in their contact position, the force on the piston is low resulting in low friction between the piston and the abutting surface. Hence the piston does not constrain lateral movement of the stylus module once the modules are connected. This has the desired result that the position of the stylus module on the sensing module is defined solely by the kinematic elements.

Other types of damper may be used between the two modules, for example conventional oil or air dampers.

The invention is not limited to damping between the kinematically coupled sensing module and stylus module. The damping may be provided on any kinematically coupled surfaces to limit the impact when they are brought together, prevent wear and damage to the kinematic elements and, where relevant, preserving the integrity of transducer deflections.

The invention claimed is:

1. Apparatus comprising a first member, the first member being arranged for releasable connection to a second member;
    said first member being provided with a set of elements to co-operate with a corresponding set of elements on the second member to define the location of the first member with respect to the second member when the first member and second member are brought into contact with one another;
    a damper on the first member, such that relative motion between the first member and second member is damped as they are brought into contact with one another.

2. Apparatus according to claim 1 wherein the first member and second member are releasably held together by magnetic means.

3. Apparatus according to any preceding claim wherein the damper comprises a housing in which a piston is located, said piston being biased to protrude from the housing and wherein the housing is filled with a viscous substance.

4. Apparatus according to any preceding claim in which the damper comprises at least one guide means which assists in guiding the first member and second member together.

5. Apparatus according to claim 4 wherein the at least one guide means comprises at least one guide pin attached to the damper, said at least one guide pin being received by at least one corresponding recess on the second member.

6. Apparatus according to claim 5 wherein the arrangement of the at least one guide pin and at least one corresponding recess is such that said at least one guide pin and recess do not interfere with the position of the first member relative to the second member as defined by the cooperating elements.

7. Apparatus according to any preceding claim wherein the first and second elements define the position of the first member with respect to the second member kinematically.

8. Apparatus according to any preceding claim wherein when the first member and second member are connected together, the position of the first member relative to the second member is defined solely by the co-operating elements.

9. Apparatus according to any preceding claim wherein the first member is a retaining module of a modular surface sensing probe and the second member is a task module of said modular surface sensing probe.

10. Apparatus according to any of claims 1–8 wherein the second member is a retaining module of a modular surface sensing probe and the first member is a task module of said modular surface sensing probe.

11. Apparatus according to any one of the preceding claims, in combination with a said second member;
    wherein the second member is also provided with a damper, such that relative motion between the first member and the second member is damped as they are brought into contact with one another.

12. A task module for releasable connection to a retaining module of a modular surface sensing probe, the task module comprising:
    a member to be releasably coupled to a retaining module;
    a set of elements on said member to cooperate with a corresponding set of elements on the retaining module to define the location of the task module with respect to the probe when the task module and retaining module are brought into contact with one another;
    and a damper on the task module, such that relative motion between the task module and retaining module is damped as they are brought into contact with one another.

13. A task module according to claim 12 wherein the retaining module and task module comprise a probe head and probe respectively.

14. A task module according to claim 12 wherein the retaining module and task module comprise a sensing module and a stylus module of a probe.

15. A task module according to any of claims 12–14 wherein the damper comprises a damper housing in the member and a damper piston located in the damper housing biased to protrude from the housing.

16. A task module according to claim 15 wherein the housing is filled with a viscous substance to resist movement of the damper piston within the damper housing.

17. A modular surface sensing probe comprising:
    a retaining module;
    a task module releasably connectable to the sensing module;
    a first set of elements on said retaining module and a second set of elements on said task module, said elements co-operating to define the location of the task module with respect to the retaining module when the task module and retaining module are brought into contact with one another;
    wherein a damper is provided on at least one of said task module and retaining module, such that relative motion between the task module and retaining module is damped as they are brought into contact with one another.

* * * * *